United States Patent [19]

Boyer et al.

[11] Patent Number: 4,702,388
[45] Date of Patent: Oct. 27, 1987

[54] LOCKING CLOSURE

[76] Inventors: Fred S. Boyer, 6188 80th St. North, Princeton Bldg., Apt. 311, St. Petersburg, Fla. 33709; Wayne A. Boyer, 1324 Greenleaf, Evanston, Ill. 60201

[21] Appl. No.: 845,577

[22] Filed: Mar. 28, 1986

[51] Int. Cl.⁴ ............................................. B65D 51/12
[52] U.S. Cl. .................................... 220/305; 220/307
[58] Field of Search ................ 220/305, 307, 315, 309

[56] References Cited

U.S. PATENT DOCUMENTS 3,366,267  1/1968  Boyer ................................. 220/309
3,762,596  10/1973  Henning et al. ..................... 220/273
4,463,870  8/1984  Coburn et al. ...................... 220/307

Primary Examiner—George T. Hall
Attorney, Agent, or Firm—Lockwood, Alex, FitzGibbon & Cummings

[57] ABSTRACT

A sheet metal plug for holes in sheet metal boxes, such as conduit holes in electrical junction boxes, includes a circular plug disc having a groove formed along a chord thereon. The plug disc is bent along the groove such that a portion of the disc is angularly displaced from the plane of the remainder thereof. A number of tabs, carried on the undersurface of the disc, are arranged to engage the edge of the hole when the plug is inserted into the hole. One of the tabs is positioned on the angularly displaced portion of the disc such that the disc is initially insertable into the hole, after which the displaced portion is straightened to bring each tab into secure engagement with the sheet metal which is being plugged. The thickness of the disc is substantially reduced along at least a portion of the groove such that its resistance to bending is substantially reduced therealong. A land or area of increased thickness bridges the groove to strengthen the disc at the groove.

10 Claims, 7 Drawing Figures

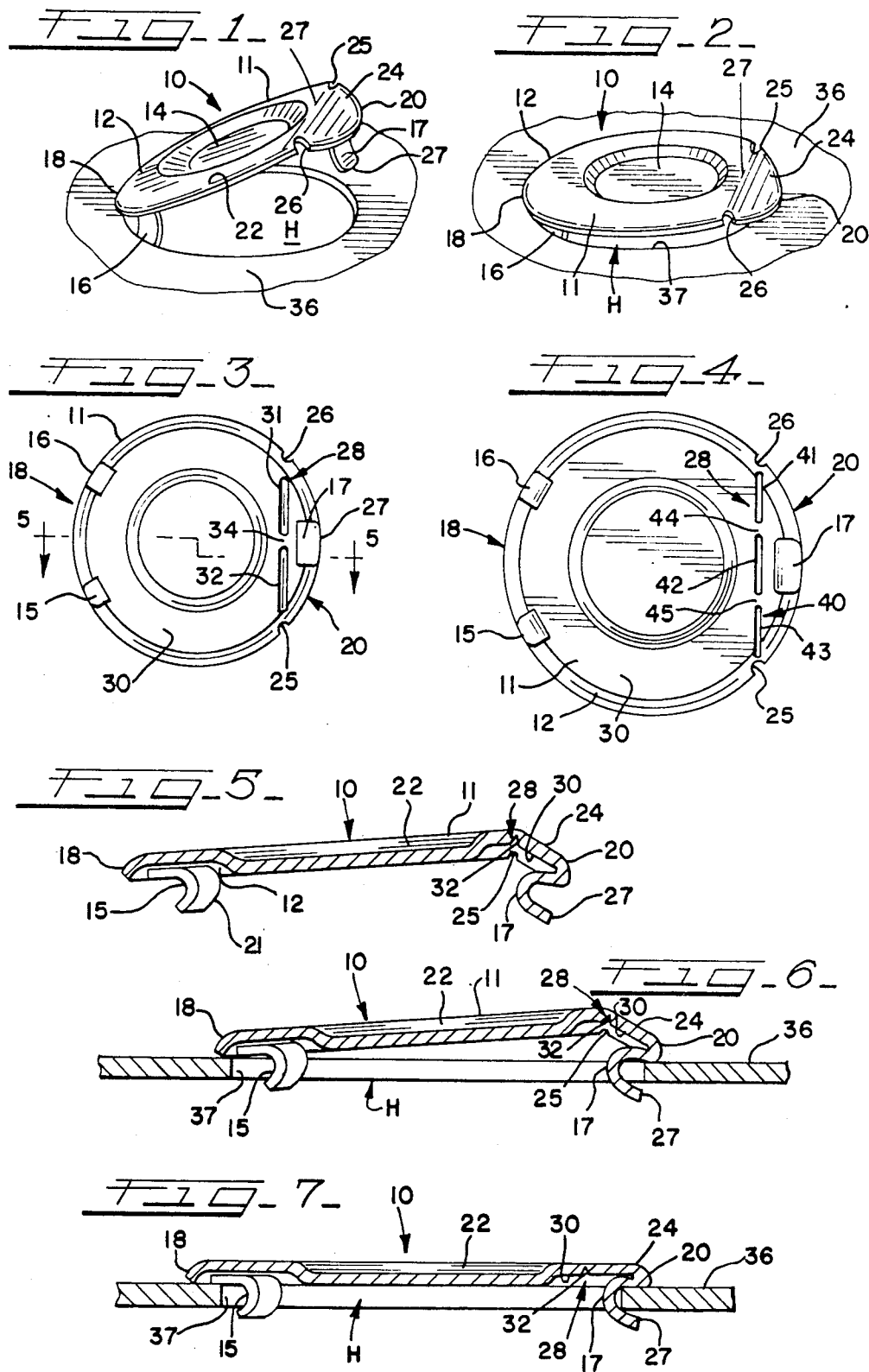

LOCKING CLOSURE

BACKGROUND AND SUMMARY OF THE INVENTION

This invention relates generally to plugs for plugging holes in relatively thin, sheet metal members or boxes and, in particular, to plugs for plugging conduit holes formed in sheet metal electrical junction boxes and control enclosures.

To simplify the task of installing electrical junction boxes and control enclosures, these structures are typically provided with a number of pre-formed conduit holes which, at the time of manufacture, are only partially formed in order to leave each hole with an easily removed "knock-out" plug. Once removed, such plugs cannot be replaced. For a number of reasons, it frequently happens that knock-out plugs are removed to result in holes which are ultimately never used. For example, changes and modifications in existing wiring may obviate the need for previously used conduit holes. Because the presence of unplugged openings in electrical junction boxes or control enclosures is undesirable both from the standpoint of safety and contamination, various plug constructions have been employed for capping unused conduit holes.

A recurrent problem in plugging such holes is that the actual hole size often varies somewhat from manufacturer to manufacturer even among holes of the same nominal "standard" dimension. Furthermore, the thickness of the sheet metal forming the boxes or control enclosures is rarely uniform among the various manufacturers. These dimensional variations complicate the task of providing plugs which function effectively, despite the variations in actual hole dimensions and sheet metal thicknesses from one box to another, to form a tight seal against the entry of dust or other foreign matter.

One prior art hole plug which is disclosed in my U.S. Pat. No. 3,366,267 offered an effective solution to the problem of hole dimension and metal thickness variations. That plug incorporated a disc having a bent angularly displaced portion formed along a chord thereof. A number of tabs along the underside of both the bent and unbent portions of the disc cooperated to securely lock the plug in the hole when the plug was inserted into the hole and pressed so as to straighten the bent portion of the disc. While this plug was effective, it is difficult to use in larger size holes since considerable force is required to straighten the bent portion when the plug diameter exceeds that required to plug a knock out hole that will receive a standard 1¼ inch electrical conduit. The use of a hammer is required in the larger size discs frequently resulting in undesirable denting and disfiguration of the disc and impairment of its sealing function.

The present invention is directed to an improved hole plug which can be effectively implemented in the larger sizes so as to provide a tight closure seal despite deviations in actual conduit hole size from standard nominal dimensions. The improved plug can be pressed into place with less force than is typically required to install similar plugs of comparable size. This reduces the possibility of denting or disfiguration of the plug disc during installation and readily adapts the plug for use in plugging large as well as small holes.

In one principal aspect of the present invention, a plug for plugging holes in sheet material includes a generally planar disc divided into a major portion and a relatively smaller minor portion joined to each other. The disc is bent along the juncture of the portions such that the minor portion is angularly displaced from the plane of the major portion. A groove is positioned at the juncture having a substantial depth relative to the thickness of the disc such that the resistance of the disc to bending along the groove is substantially reduced.

In another principal aspect of the present invention, the groove comprises a plurality of groove segments in longitudinal alignment with one another and separated from each other by lands which are of greater thickness than the depth of the groove segments.

In still another principal aspect of the present invention, each groove segment is of substantially V-shaped cross section.

In still another principal aspect of the present invention, the depth of the groove is between about 25%–60% of the thickness of the disc.

In still another principal aspect of the present invention, the disc is substantially circular and the juncture between the major and minor portions is on a chord of the disc.

These and other objects, features and advantages of the present invention will be clearly understood through consideration of the following detailed description.

BRIEF DESCRIPTION OF THE DRAWING

In the course of this description, reference will frequently be made to the accompanying drawing in which:

FIG. 1 is a perspective view of a preferred embodiment of plug constructed in accordance with the principles of the invention and shown being inserted into a hole which is to be plugged;

FIG. 2 is a perspective view of the plug shown in FIG. 1 being pressed into locking engagement;

FIG. 3 is a bottom plan view of the plug substantially as illustrated in FIG. 1;

FIG. 4 is a bottom plan view of a plug similar to FIG. 3, but of a larger diameter;

FIG. 5 is an enlarged cross-sectioned side elevation view of the plug as viewed substantially along line 5—5 of FIG. 3;

FIG. 6 is a cross-sectioned side elevation view of the plug substantially as shown in FIG. 5 being inserted in the hole, but prior to being pressed into its locked position; and FIG. 7 is a cross-sectioned side elevation view, similar to FIG. 6, but showing the plug locked in place in the hole.

DESCRIPTION OF THE PREFERRED EMBODIMENT

Referring to the Figures and in particular to FIGS. 1, 2 and 3, a plug 10 constructed in accordance with the principles of the invention is illustrated. Plug 10 comprises a generally circular, plate-like plug member or disc 11, which is of somewhat greater diameter than the diameter of the hole H to be plugged. As illustrated in FIG. 1, the plug disc 11 includes a turned-down lip 12 around its periphery. The disc 11 may also include a generally circular depression 14 adjacent its center.

The underside of plug disc 11 is provided with three locking tabs 15, 16 and 17 adjacent the periphery thereof which are arranged to engage the edges of the hole which is to be plugged, such as a conduit hole in a junction box or similar structure. Three locking tabs are preferably employed, although it will be understood that the invention can be successfully practiced with more or less than three tabs. Locking tabs 15 and 16 are preferably positioned toward one side of the disc 11 which will hereinafter be referred to as the trailing edge 18 of the disc. Locking tab 17 is positioned opposite tabs 15 and 16 on what will hereinafter be referred to as the leading edge 20 of disc 11.

As illustrated in FIG. 5, locking tabs 15-17 comprise downwardly depending tabs having a curved portion 21 which engages the edge of the hole adjacent the perimeter of the hole. Tabs 15 and 16 project downward from trailing edge 18 of the disc and tab 17 projects downwardly from the leading edge 20 of the disc. The tabs 15-17 are angled relative to the disc such that the curved portion 21 is inwardly spaced from the periphery of the disc and is vertically spaced from the undersurface thereof. The tabs 15-17 may either be bent from the metal which forms the disc or may comprise separate elements which are attached to the undersurface of the disc by means of welding or crimping, bending being preferred.

As further illustrated in FIGS. 1-3 and 5, the leading edge 20 of the disc 11 is bent downwardly such that the forward locking tab 17 is displaced toward the rear locking tabs 15 and 16. The bend is formed along a chord of the generally circular disc 11 such that the disc is divided into a major portion 22 and a minor portion 24. The minor portion is thereby angularly displaced from the plane defined by the major portion of the disc and forms an obtuse angle relative thereto. A plurality of notches, for example 25 and 26 as shown in FIG. 3, are located along the bend line 27 between the major and minor portions and in the lip 12 to facilitate bending. When the minor portion 24 is angularly displaced as shown in FIGS. 1 and 5, the tab 17 will be displaced toward the trailing edge 18 of disc 11. Accordingly, the outermost tip 27 of tab 17 will be inwardly displaced by an amount sufficient to allow the plug to be easily inserted into the hole without interference.

Also to facilitate bending and in accordance with the present invention, an elongate groove generally 28 is formed in the undersurface 30 of plug disc 11 along the bend chord or line 27 separating the major and minor portions 22 and 24. At the groove 28 the thickness of the disc 11 is substantially reduced. As illustrated in FIG. 3, groove 28 includes two distinct segments 31 and 32 in generally end-to-end longitudinal alignment and the segments are separated by a land or area of relatively greater thickness 34 to compensate for the weakening in the disc which would otherwise result due to the presence of the groove 28 as will be discussed in more detail to follow.

FIGS. 1, 2, 6 and 7 illustrate the installation of the plug 10. Installation is initiated by slightly canting plug 10 and pushing the trailing edge 18 of disc 11 downward toward hole H such that the locking tabs 15 and 16 project through the hole and engage the rearward edge 37 of the hole. Preferably, the curvature of the curved portions 21 of tabs 15 and 16 is such that each tab hooks the edge 37 so as to hold the trailing edge 18 of disc 11.

The leading edge 20 of the disc is next moved toward the opposite side of hole H such that it contacts the upper surface of the sheet material 36 adjacent the hole as illustrated in FIG. 6. Once the plug is so positioned, disc 11 is pressed downwardly toward the sheet material 36. When this occurs the minor portion 24 returns to a position substantially coplanar with the remainder of plug disc 11 and the leading edge 27 of tab 17 is displaced outwardly so as to engage the edge 37 of the hole as shown in FIG. 7. Preferably, locking tab 17 is sized and shaped to hook the edge 37 in order to firmly lock the plug into the hole.

The groove 28 is formed such that the resistance of disc 11 to bending is minimized so that the minor portion 24 may be easily returned to its coplanar position as shown in FIG. 7 without the need for hammering and the like. Accordingly, the possibility of disfiguration of the plug is minimized even in plugs of increased diameter. To this end, the depth of groove 28 is substantial relative to the thickness of the material from which the disc is formed. The depth of the groove is preferably between about 25%, to 60% of the thickness of the disc material.

Plug 10 is preferably made of sheet metal and is formed by stamping. Groove 28 is preferably of V-shaped cross section so that during stamping, the metal of the plug is cut. This minimizes the displacement of metal during formation and reduces the potential for deformation of the plug as the groove is formed.

Although a groove 28 of such substantial depth relative to disc thickness substantially facilitates return of the minor portion 22 to its coplanarity, the disc is substantially weakened to the extent that it might be susceptible to breaking or tearing along the groove during installation. It has been found, however, that if the groove is discontinuous and formed in segments separated by increased thickness lands strength is retained without any substantial loss of ease of bending. In smaller plug sizes, such as that illustrated in FIG. 3, two groove segments 31 and 32 separated by a single land 34 has been found to be sufficient. In larger plugs, such as those intended for plugging holes intended to receive 1½ or 2 inch standard electrical canduits, the groove 40, as shown in FIG. 4, preferably includes three distinct groove segments 41, 42 and 43 separated by two lands 44 and 45 of somewhat less or of the same thickness as the disc material.

It will be appreciated that the various dimensions and shapes of the plug constructed in accordance with the invention may vary depending on the size and shape of the hole which is to be plugged. By way of example, in a plug constructed to plug a hole for receiving a standard one inch electrical conduit, the diameter of plug disc 11 may be 1 and 9/16 inches and formed of sheet steel having a thickness of 0.045 inch. In such plug the groove 28 is formed by two segments each 11/32 inch long in end-to-end longitudinal alignment and the land 34 between the adjacent ends of the segments may be ⅛ inch long. Each groove segment may be V-shaped in cross section and cut to a maximum depth of 95% the thickness of the sheet metal. After stamping, the minor portion 24 is bent down along the groove so as to form an angle of approximately 25° with respect to the plane of the major portion 22 of the disc.

It will be appreciated that variations can be made in the dimensions, shapes and orientations of various other elements of the plug without departing from the spirit and scope of the invention. For example, the size, shape, number and position of locking tabs may be altered to meet the requirements of specific applications.

While a particular embodiment of the invention has been shown and described, it will be clear to those skilled in the art that changes and modifications may be made without departing from the spirit and scope of the invention.

We claim:

1. In a plug for plugging holes in sheet material wherein the plug includes a generally planar disc divided into a pair of portions joined to each other, and in which at least one of the portions is angularly displaceable from the plane of the disc at the juncture between the portions, the improvement therein comprising;
 a groove positioned at said juncture, said groove having a substantial depth relative to the thickness of the disc such that the resistance of the disc to bending along said groove is substantially reduced; and
 at least one land across said groove.

2. The plug of claim 1, wherein said groove comprises a plurality of groove segments in longitudinal alignment with each other, said segments being separated from each other by said land, said land being of greater thickness than the depth of said groove segments.

3. The plug of claim 2, wherein said groove is of substantially V-shaped cross section.

4. The plug of claim 2, wherein the depth of said groove is between about 25%-60% of the thickness of the disc.

5. The plug of claim 2, wherein said groove includes three of said groove segments.

6. The plug of claim 2, wherein said disc is substantially circular and the juncture between said portions is on a chord of said disc to divide said disc into major and minor portions.

7. The plug of in claim 1, wherein said groove is of substantially V-shaped cross section.

8. The plug of claim 1, wherein the depth of said groove is between about 25%-60% of the thickness of the disc.

9. The plug of claim 1, wherein said groove includes at least a pair of segments in longitudinal alignment with each other and separated from each other by said land.

10. The plug of claim 1, wherein said disc is substantially circular and the juncture between said portions is on a chord of said disc to divide said disc into major and minor portions.

* * * * *